(12) United States Patent
Lien

(10) Patent No.: US 8,605,564 B2
(45) Date of Patent: Dec. 10, 2013

(54) AUDIO MIXING METHOD AND AUDIO MIXING APPARATUS CAPABLE OF PROCESSING AND/OR MIXING AUDIO INPUTS INDIVIDUALLY

(75) Inventor: Yi-Ju Lien, New Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 8 days.

(21) Appl. No.: 13/095,888

(22) Filed: Apr. 28, 2011

(65) Prior Publication Data

US 2012/0275277 A1   Nov. 1, 2012

(51) Int. Cl.
*G11B 7/00* (2006.01)

(52) U.S. Cl.
USPC ........................................ 369/124.09; 700/94

(58) Field of Classification Search
USPC ................. 369/4, 47.16, 47.2, 47.19, 124.02, 369/124.04, 124.05, 124.06, 124.09, 47.15, 369/124.01; 700/94; 381/119, 61, 17; 704/500
See application file for complete search history.

(56) References Cited

U.S. PATENT DOCUMENTS

| | | | | |
|---|---|---|---|---|
| 5,862,228 | A * | 1/1999 | Davis | 381/17 |
| 6,781,933 | B1 * | 8/2004 | Shigaki | 369/47.1 |
| 7,877,156 | B2 * | 1/2011 | Fujimoto et al. | 700/94 |
| 2006/0173691 | A1 * | 8/2006 | Mukaide | 704/500 |
| 2006/0274905 | A1 * | 12/2006 | Lindahl et al. | 381/61 |
| 2006/0287744 | A1 * | 12/2006 | Kim et al. | 700/94 |
| 2007/0172195 | A1 * | 7/2007 | Hattori et al. | 386/54 |
| 2008/0080725 | A1 * | 4/2008 | Mukaide et al. | 381/119 |
| 2008/0159095 | A1 * | 7/2008 | Shigaki | 369/47.35 |
| 2009/0024234 | A1 * | 1/2009 | Archibald | 700/94 |
| 2009/0196438 | A1 * | 8/2009 | Jeong et al. | 381/119 |
| 2011/0038423 | A1 * | 2/2011 | Lee et al. | 375/240.26 |
| 2012/0053710 | A1 * | 3/2012 | Lindahl et al. | 700/94 |

FOREIGN PATENT DOCUMENTS

WO    WO 2010038318 A1 * 4/2010

* cited by examiner

*Primary Examiner* — Thang Tran

(74) *Attorney, Agent, or Firm* — Winston Hsu; Scott Margo

(57) ABSTRACT

An audio mixing method includes: performing an audio processing operation upon a first audio input derived from at least one decoded audio input to generate a processed audio output, and generating a mixed audio signal by mixing at least a second audio input and the processed audio output. An audio mixing apparatus includes an audio processing circuit and an audio mixing circuit. The audio processing circuit is utilized for performing an audio processing operation upon a first audio input derived from at least one decoded audio input and accordingly generating a processed audio output. The audio mixing circuit is coupled to the audio processing circuit, and utilized for generating a mixed audio signal by mixing at least a second audio input and the processed audio output.

30 Claims, 12 Drawing Sheets

AUDIO MIXING METHOD AND AUDIO MIXING APPARATUS CAPABLE OF PROCESSING AND/OR MIXING AUDIO INPUTS INDIVIDUALLY

BACKGROUND

The disclosed embodiments of the present invention relate to mixing audio inputs, and more particularly, to an audio mixing method and audio mixing apparatus capable of processing and/or mixing audio inputs individually.

When there are multiple audio inputs, an audio mixing operation may be performed for mixing the audio inputs to generate a mixed audio output for following audio playback. Taking a Blu-ray disc (BD) playback system for example, a BD disc may provide a plurality of audio inputs, such as a primary audio bitstream, a secondary audio bitstream, and an effect sound data which may be a pulse-code modulation (PCM) stream, when loaded into a BD player and accessed by the BD player. Besides, the BD player has multiple audio output interfaces, such as an analog interface (i.e., L/R RCA jacks) and a high-definition multimedia interface (HDMI). Generally, the multiple audio output interfaces are required to provide multiple audio outputs simultaneously. In a conventional design of the BD player, the effect sound data (i.e., a PCM stream) is mixed with the primary audio bitstream and/or the secondary audio bitstream, and then the mixed result is post-processed to generate the required audio outputs to the audio output interfaces.

The conventional design of the BD player has many drawbacks. For example, when the effect sound data corresponds to a mono channel, the mono effect sound should be preferably mixed to a center channel if the center channel exists. Consider a case where the analog interface of the BD player is a stereo audio interface. If the effect sound mixing is performed by referring to the channel configuration supported by the analog interface of the BD player, the effect sound is mixed to a left channel and a right channel. However, when the HDMI interface of the BD player is connected to a speaker system supporting multi-channel playback (e.g., a 5.1-channel speaker system), no effect sound is played via a center-channel speaker due to the fact that the effect sound is mixed to the left channel and the right channel rather than the center channel. As a result, a user who has the 5.1-channel speaker system fails to have the best listening experience of the effect sound playback. Besides, as the post-processing is performed after all of the available audio inputs are mixed, there is no option allowed to post-process the audio inputs individually.

SUMMARY

In accordance with exemplary embodiments of the present invention, an audio mixing method and audio mixing apparatus capable of processing and/or mixing audio inputs individually are proposed to solve the above-mentioned problem.

According to a first aspect of the present invention, an exemplary audio mixing method is disclosed. The exemplary audio mixing method includes: performing a first audio processing operation upon a first audio input derived from at least one decoded audio input and accordingly generating a processed audio output; and generating a mixed audio signal by mixing at least a second audio input and the processed audio output.

According to a second aspect of the present invention, an exemplary audio mixing method is disclosed. The exemplary audio mixing method includes: performing a first audio processing operation upon a first audio input derived from mixing a plurality of first specific audio inputs and accordingly generating a processed audio output; and generating a mixed audio signal by mixing at least a second audio input and the processed audio output.

According to a third aspect of the present invention, an exemplary audio mixing method is disclosed. The exemplary audio mixing method includes: performing a first audio processing operation upon a first audio input and accordingly generating a first processed audio output; performing a second audio processing operation upon a second audio input and accordingly generating a second processed audio output, wherein each of the first audio input and the second audio input is derived from a non-encoded sound data; generating a first mixed audio signal by mixing at least a third audio input and the first processed audio output; and generating a second mixed audio signal by mixing at least a fourth audio input and the second processed audio output.

According to a fourth aspect of the present invention, an exemplary audio mixing method includes: generating a first mixed audio signal for a first audio output interface by mixing a plurality of first audio signals according to a first sound mixing configuration; and generating a second mixed audio signal for a second audio output interface by mixing a plurality of second audio signals according to a second sound mixing configuration which is different from the first sound mixing configuration, wherein one of the first audio signals and one of the second audio signals are derived from a non-encoded sound data.

According to a fifth aspect of the present invention, an exemplary audio mixing apparatus is disclosed. The exemplary audio mixing apparatus includes an audio processing circuit and an audio mixing circuit. The audio processing circuit is utilized for performing an audio processing operation upon a first audio input derived from at least one decoded audio input and accordingly generating a processed audio output. The audio mixing circuit is coupled to the audio processing circuit, and utilized for generating a mixed audio signal by mixing at least a second audio input and the processed audio output.

According to a sixth aspect of the present invention, an exemplary audio mixing apparatus is disclosed. The exemplary audio mixing apparatus includes an audio processing circuit and an audio mixing circuit. The audio processing circuit is utilized for performing an audio processing operation upon a first audio input derived from mixing a plurality of specific audio inputs and accordingly generating a processed audio output. The audio mixing circuit is coupled to the audio processing circuit, and utilized for generating a mixed audio signal by mixing at least a second audio input and the processed audio output.

According to a seventh aspect of the present invention, an exemplary audio mixing apparatus is disclosed. The exemplary audio mixing apparatus includes a first audio processing circuit, a second audio processing circuit, a first audio mixing circuit, and a second audio mixing circuit. The first audio processing circuit is utilized for performing a first audio processing operation upon a first audio input and accordingly generating a first processed audio output. The second audio processing circuit is utilized for performing a second audio processing operation upon a second audio input and accordingly generating a second processed audio output, wherein each of the first audio input and the second audio input is derived from a non-encoded sound data. The first audio mixing circuit is coupled to the first audio processing circuit, and utilized for generating a first mixed audio signal by mixing at least a third audio input and the first processed audio output. The second audio mixing circuit is coupled to the second audio processing circuit, and utilized for generating a second mixed audio signal by mixing at least a fourth audio input and the second processed audio output.

According to an eighth aspect of the present invention, an exemplary audio mixing apparatus is disclosed. The exemplary audio mixing apparatus includes a first audio mixing circuit and a second audio mixing circuit. The first audio mixing circuit is arranged to generate a first mixed audio signal for a first audio output interface by mixing a plurality of first audio signals according to a first sound mixing configuration. The second audio mixing circuit is arranged to generate a second mixed audio signal for a second audio output interface by mixing a plurality of second audio signals according to a second sound mixing configuration which is different from the first sound mixing configuration, wherein one of the first audio signals and one of the second audio signals are derived from a non-encoded sound data.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
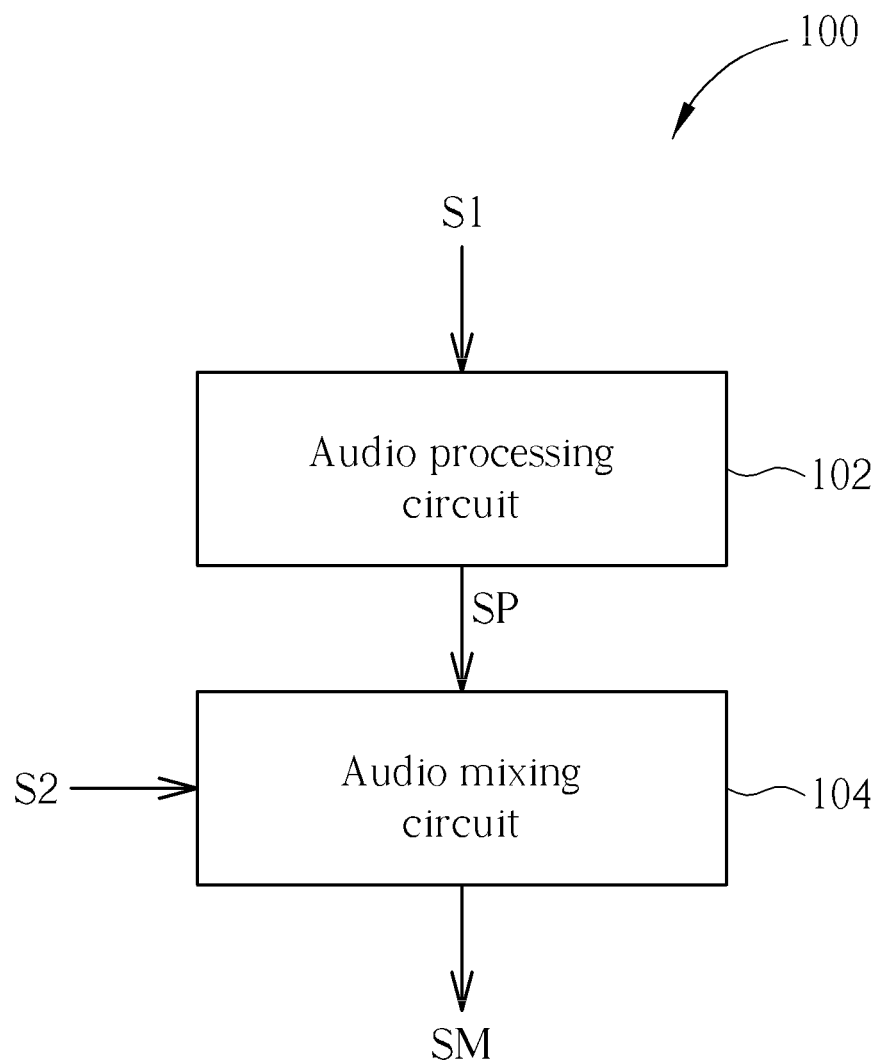
FIG. 1 is a diagram illustrating an audio mixing apparatus according to a first exemplary implementation of the present invention.

FIG. 1 is a diagram illustrating an audio mixing apparatus according to a first exemplary implementation of the present invention. The exemplary audio mixing apparatus 100 includes, but is not limited to, an audio processing circuit 102 and an audio mixing circuit 104. The audio processing circuit 102 is utilized for performing an audio processing operation upon a first audio input S1 and accordingly generating a processed audio output SP. For example, the audio processing operation may be a post-processing operation used to add one or more special sound effects to the first audio input S1. However, this is for illustrative purposes only, and is not meant to be a limitation of the present invention. In an alternative design, the audio processing operation may be any editing operation which adjusts the first audio input S1 but adds no special sound effect to the first audio input S1. This also falls within the scope of the present invention. The audio mixing circuit 104 is utilized for generating a mixed audio signal SM by mixing at least a second audio input S2 and the processed audio output SP. Please note that the first audio input S1 may be derived from at least one decoded audio input or derived from mixing a plurality of specific audio inputs. Further details are described as follows.

Figure 2:
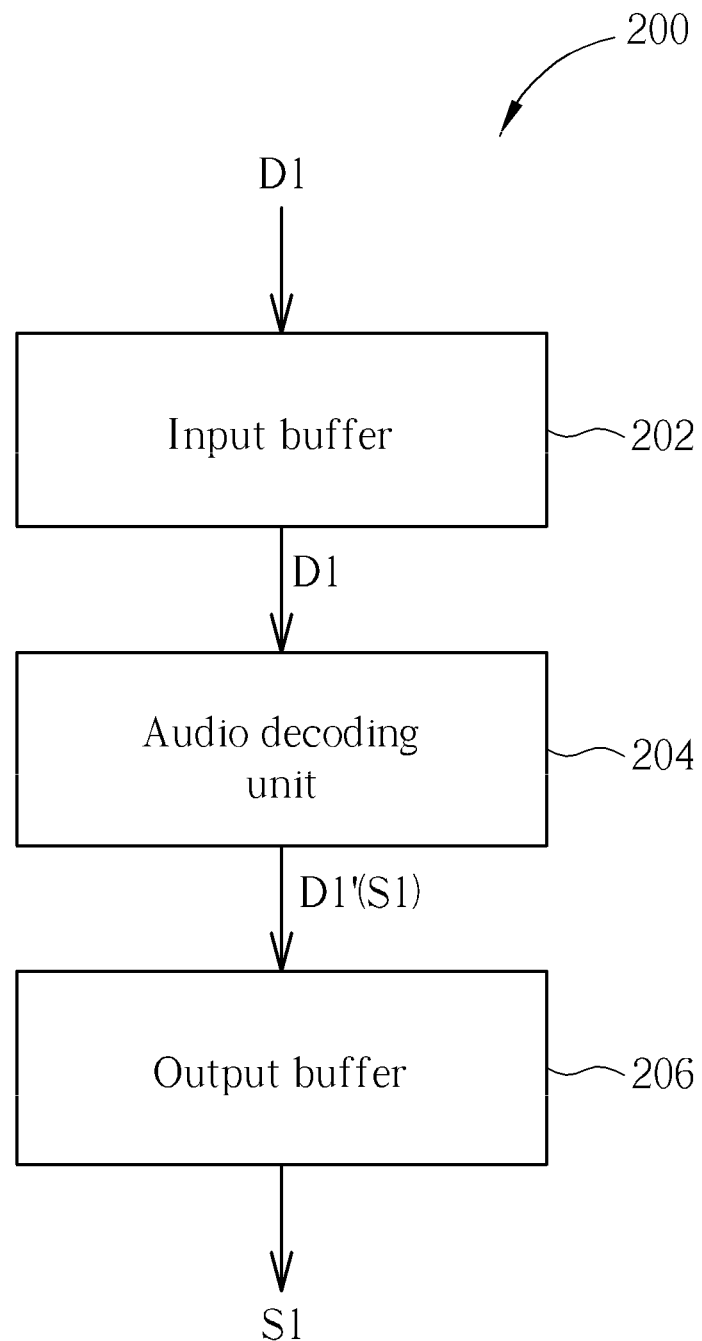
FIG. 2 is a diagram illustrating a signal processing module for generating the first audio input shown in FIG. 1 according to a first exemplary embodiment of the present invention.

Please refer to FIG. 2, which is a diagram illustrating a signal processing module for generating the first audio input S1 shown in FIG. 1 according to a first exemplary embodiment of the present invention. The exemplary signal processing module 200 includes, but is not limited to, an input buffer 202, an audio decoding unit 204, and an output buffer 206. The input buffer 202 may be a first-in first-out (FIFO) buffer and used for buffering a first encoded audio data D1 provided by a signal source such as an optical storage medium, a computer network, a memory device, or any apparatus capable of providing an encoded sound data. For example, the first encoded audio data D1 may be a primary audio bitstream or a secondary audio bitstream read from an optical storage medium (e.g., a BD disc). Please note that this is for illustrative purposes only, and is not meant to be a limitation of the present invention. The audio decoding unit 204 is arranged to decode the first encoded audio data D1 and accordingly generate a first decoded audio input D1' to the output buffer 206, wherein the first decoded audio input D1' serves as the first audio input S1 mentioned above. Next, the output buffer 206 outputs the first audio input S1 to the audio processing circuit 102 shown in FIG. 1.

Figure 3:
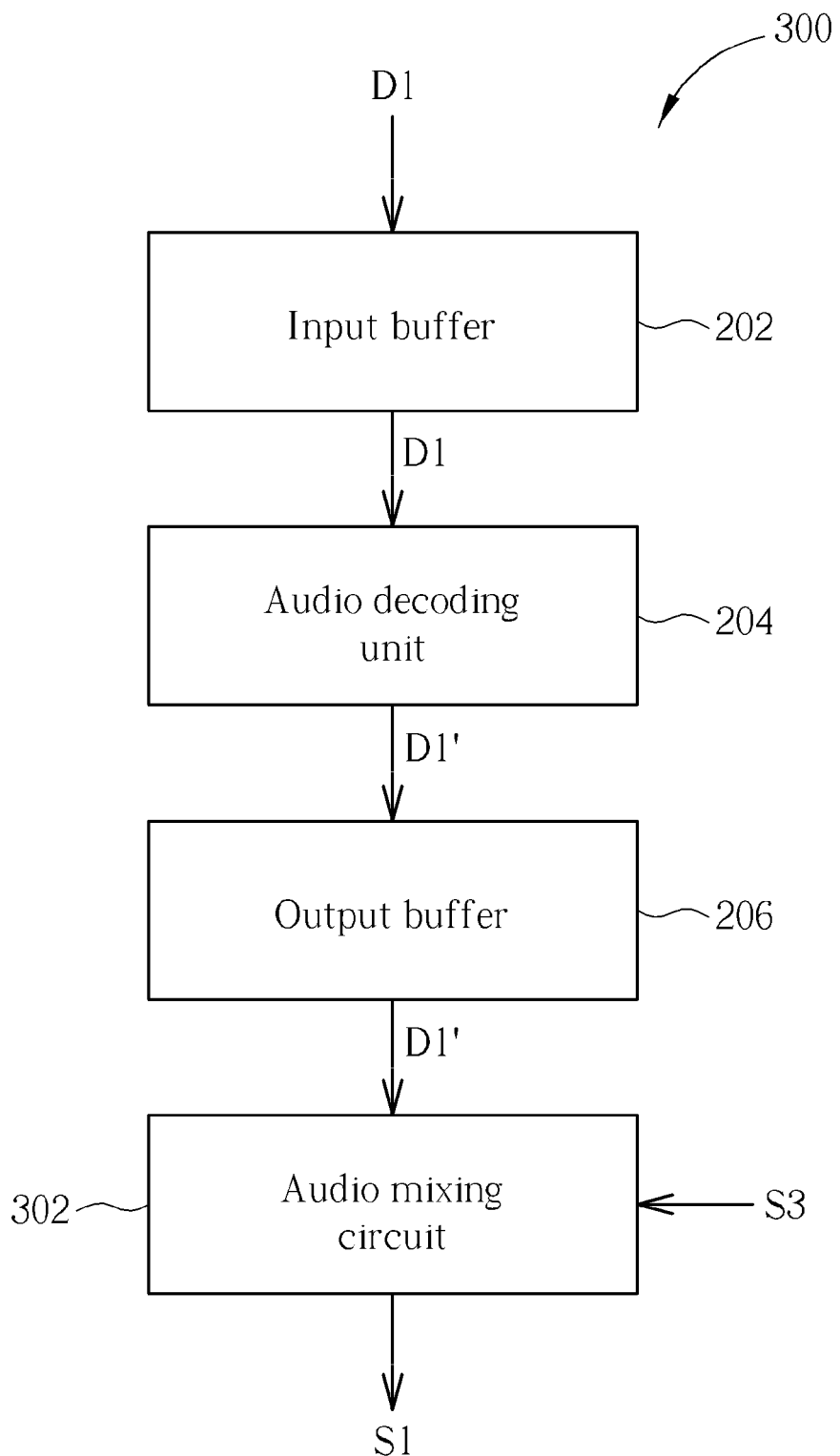
FIG. 3 is a diagram illustrating a signal processing module for generating the first audio input shown in FIG. 1 according to a second exemplary embodiment of the present invention.

Please refer to FIG. 3, which is a diagram illustrating a signal processing module for generating the first audio input S1 shown in FIG. 1 according to a second exemplary embodiment of the present invention. The exemplary signal processing module 300 includes, but is not limited to, the aforementioned input buffer 202, audio decoding unit 204 and output buffer 206, and an audio mixing circuit 302 coupled to the output buffer 206. The major difference between the signal processing modules 200 and 300 is that the first decoded audio input D1' in the signal processing module 300 is fed into the audio mixing circuit 302 instead of directly serving as the first audio input S1. More specifically, the combination of the input buffer 202, audio decoding unit 204 and output buffer 206 provides the first decoded audio input D1' to the audio mixing circuit 302, and the audio mixing circuit 302 generates the first audio input S1 to the audio processing circuit 102 shown in FIG. 1 by mixing the first decoded audio input D1' and a third audio input S3.

Figure 4:
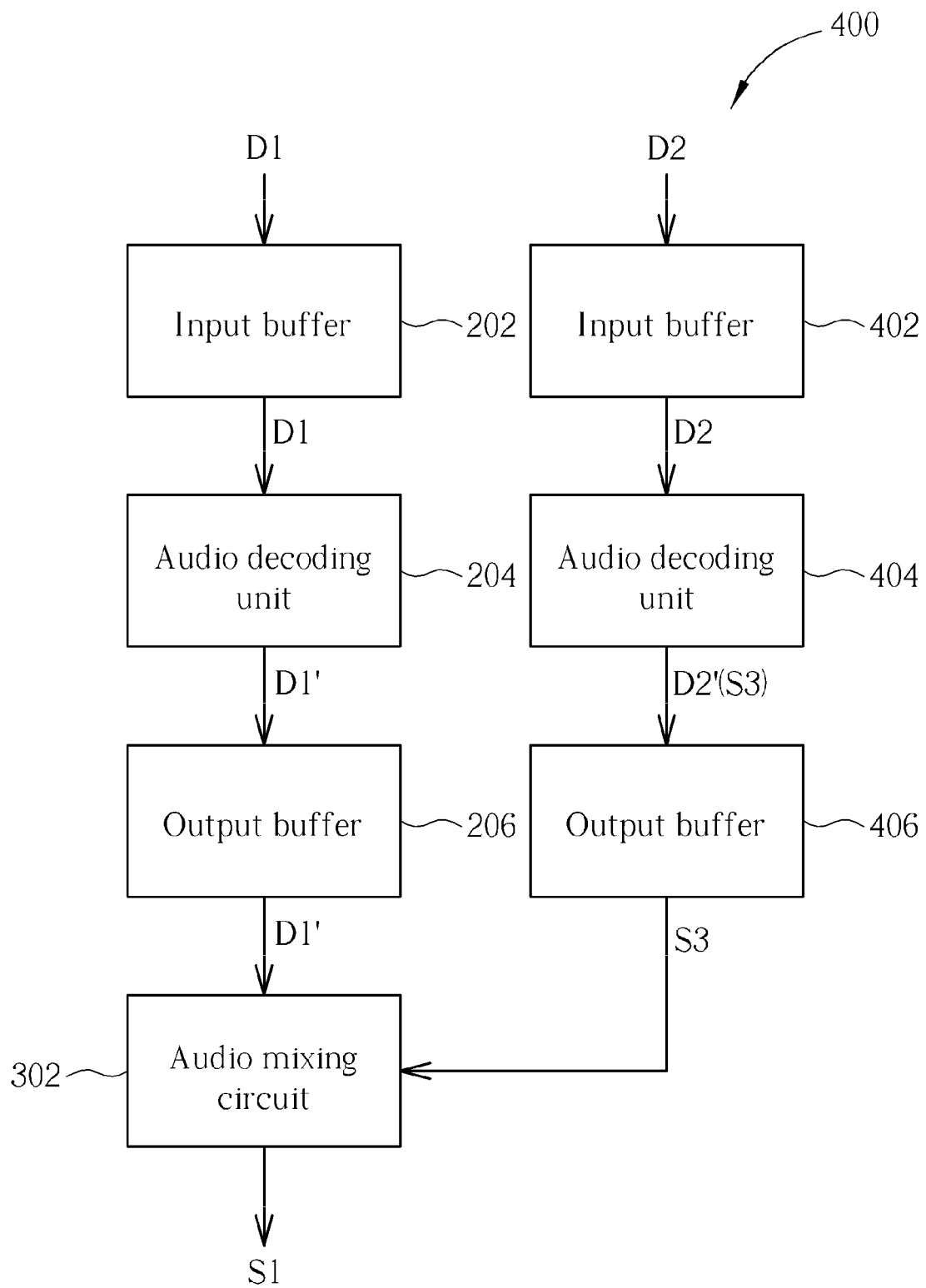
FIG. 4 is a diagram illustrating a signal processing module for generating the first audio input shown in FIG. 1 according to a third exemplary embodiment of the present invention.

In above exemplary embodiment, the third audio input S3 may be any audio bitstream capable of being mixed with the first decoded audio input D1'. By way of example, but not limitation, the third audio input S3 may be derived from decoding an encoded data. Please refer to FIG. 4, which is a diagram illustrating a signal processing module for generating the first audio input S1 shown in FIG. 1 according to a third exemplary embodiment of the present invention. The exemplary signal processing module 400 includes, but is not limited to, the aforementioned input buffer 202, audio decoding unit 204, output buffer 206 and audio mixing circuit 302, an input buffer 402, an audio decoding unit 404, and an output buffer 406. The input buffer 402 may be a FIFO buffer and used for buffering a second encoded audio data D2. For example, one of the first encoded audio data D1 and the second encoded audio data D2 may be a primary audio bitstream read from an optical storage medium (e.g., a BD disc), and the other of the first encoded audio data D1 and the second encoded audio data D2 may be a secondary audio bitstream read from the same optical storage medium. However, this is for illustrative purposes only, and is not meant to be a limitation of the present invention. For example, one or both of the first encoded audio data D1 and the second encoded audio data D2 may be provided by a signal source such as an optical storage medium, a computer network, a memory device, or any apparatus capable of providing an encoded sound data. The audio decoding unit 404 is arranged to decode the second encoded audio data D2 and accordingly generate a second decoded audio input D2' to the output buffer 406, wherein the second decoded audio input D2' serves as the third audio input S3 mentioned above. Next, the output buffer 406 outputs the third audio input S3 to the audio mixing circuit 302.

Regarding the second audio input S2 shown in FIG. 1, it may be any audio bitstream capable of being mixed with the processed audio output SP. Please refer to FIG. 5, which is a diagram illustrating a signal processing module for generating the second audio input S2 shown in FIG. 1 according to a first exemplary embodiment of the present invention. The exemplary signal processing module 500 includes, but is not limited to, an optical storage medium accessing block 502 and a buffer (e.g., a FIFO buffer) 504. The optical storage medium accessing block 502 includes components required for reading information stored on an optical storage medium (e.g., a BD disc) 501. In this exemplary embodiment, the optical storage medium accessing block 502 reads the optical storage medium 501 and accordingly generates a readout data DATA_R to the buffer 504, wherein the readout data DATA_R serves as the second audio input S2 mentioned above. By way of example, but not limitation, the readout data DATA_R (i.e., the second audio input S2) may be a non-encoded sound data (e.g., a PCM stream) stored on the optical storage medium 501. For example, the non-encoded sound data may be an effect sound data when the optical storage medium 501 is a BD disc. Next, the buffer 504 outputs the second audio input S2 to the audio mixing circuit 104 shown in FIG. 1.

Figure 5:
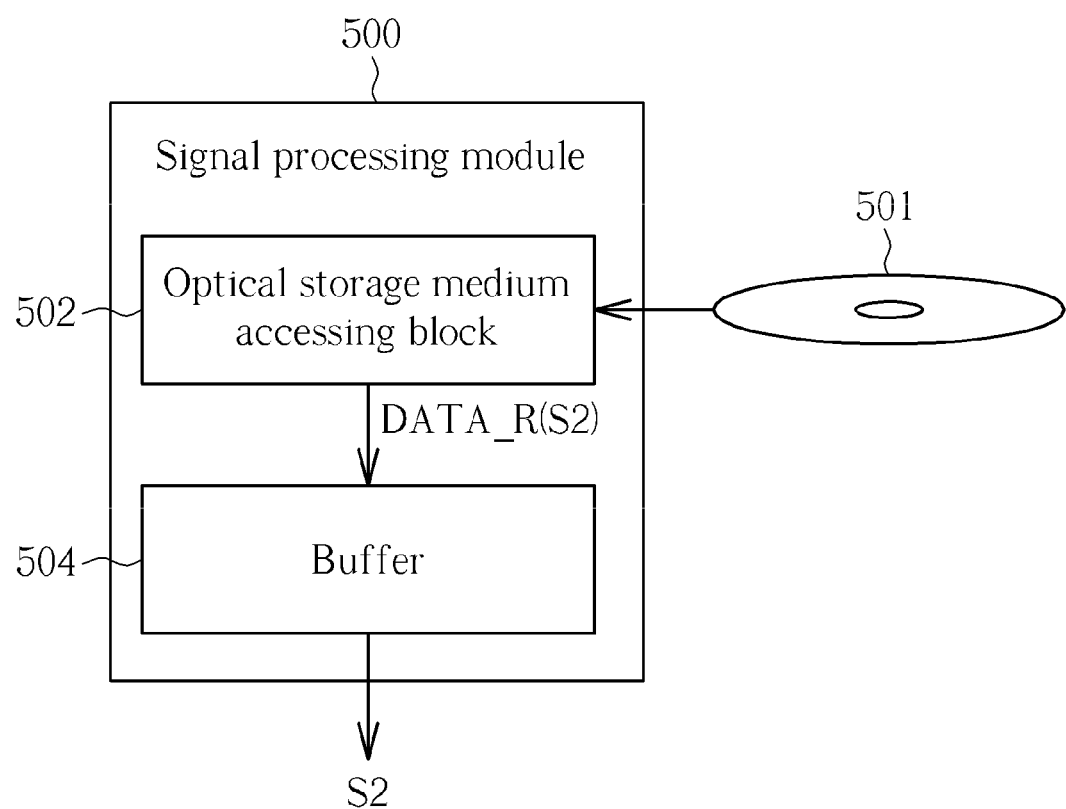
FIG. 5 is a diagram illustrating a signal processing module for generating the second audio input shown in FIG. 1 according to a first exemplary embodiment of the present invention.

Please note that FIG. 5 merely shows one possible source of the non-encoded sound data acting as the aforementioned second audio input S2. The non-encoded sound data (e.g., a PCM stream) may be obtained from a signal source other than an optical storage medium. For example, the non-encoded sound data may be provided by a computer network, a memory device, or any apparatus capable of providing the non-encoded sound data.

Figure 6:
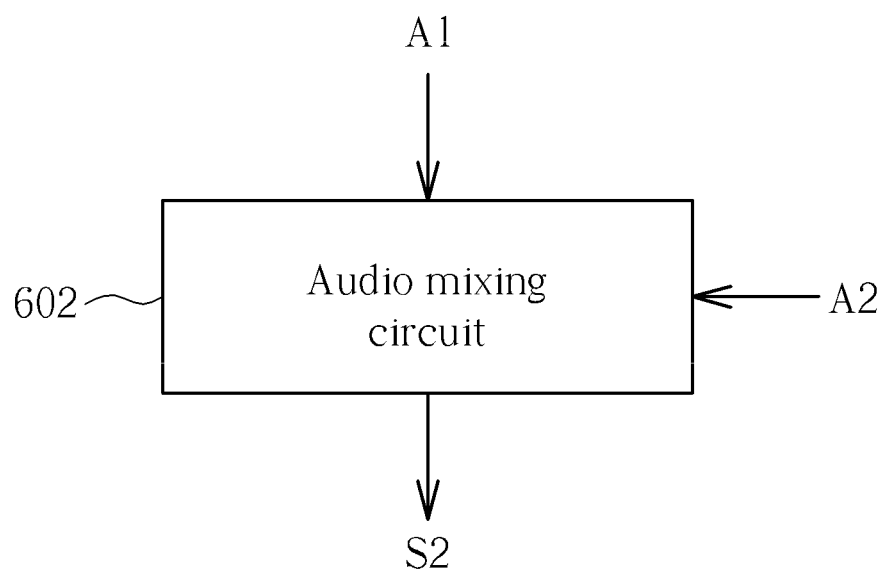
FIG. 6 is a diagram illustrating a signal processing module for generating the second audio input shown in FIG. 1 according to a second exemplary embodiment of the present invention.

Please refer to FIG. 6, which is a diagram illustrating a signal processing module for generating the second audio input S2 shown in FIG. 1 according to a second exemplary embodiment of the present invention. The exemplary signal processing module is simply implemented by an audio mixing circuit 602 which is arranged to mix a plurality of specific audio inputs A1, A2 and accordingly generate the second audio input S2 to the audio mixing circuit 104 shown in FIG. 1. The specific audio inputs A1 and A2 may be any audio bitstreams capable of being mixed to form the desired second audio input S2. For example, at least one of the specific audio inputs A1 and A2 is derived from a signal source such as an optical storage medium, a computer network, a memory device, or any apparatus capable of providing a sound data.

Figure 7:
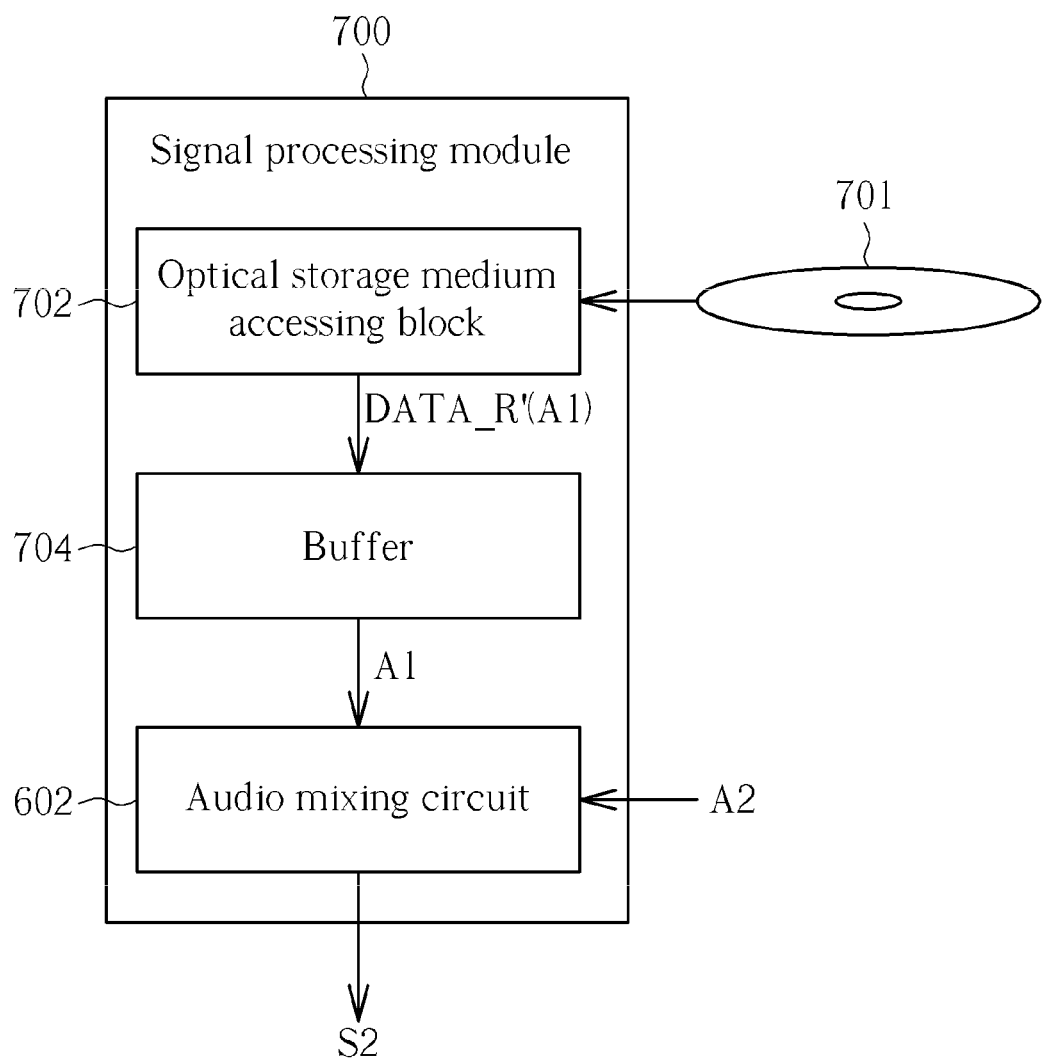
FIG. 7 is a diagram illustrating a signal processing module for generating the second audio input shown in FIG. 1 according to a third exemplary embodiment of the present invention.

Please refer to FIG. 7, which is a diagram illustrating a signal processing module for generating the second audio input S2 shown in FIG. 1 according to a third exemplary embodiment of the present invention. The exemplary signal processing module 700 includes, but is not limited to, the aforementioned audio mixing circuit 602, an optical storage medium accessing block 702, and a buffer (e.g., a FIFO buffer) 704. The optical storage medium accessing block 702 includes components required for reading information stored on an optical storage medium (e.g., a BD disc) 701. In this exemplary embodiment, the optical storage medium accessing block 702 reads the optical storage medium 701 and accordingly generates a readout data DATA_R' to the buffer 704, wherein the readout data DATA_R' serves as the specific audio input A1 mentioned above. By way of example, but not limitation, the readout data DATA_R' (i.e., the specific audio input A1) may be a non-encoded sound data (e.g., a PCM stream) stored on the optical storage medium 701. For example, the non-encoded sound data may be an effect sound data when the optical storage medium 701 is a BD disc. Next, the buffer 704 outputs the specific audio input A1 to the audio mixing circuit 602.

Similarly, FIG. 7 merely shows one possible source of the non-encoded sound data acting as the aforementioned specific audio input A1. The non-encoded sound data (e.g., a PCM stream) may be obtained from a signal source other than an optical storage medium. For example, the non-encoded sound data may be provided by a signal source such as a computer network, a memory device, or any apparatus capable of providing the non-encoded sound data.

Figure 8:
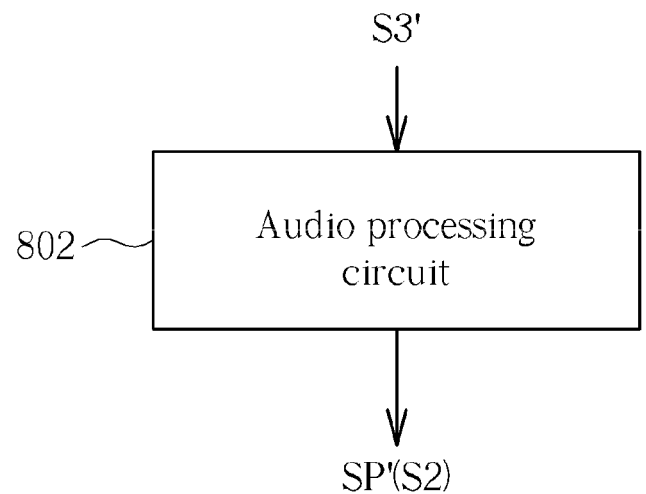
FIG. 8 is a diagram illustrating a signal processing module for generating the second audio input shown in FIG. 1 according to a fourth exemplary embodiment of the present invention.

Please refer to FIG. 8, which is a diagram illustrating a signal processing module for generating the second audio input S2 shown in FIG. 1 according to a fourth exemplary embodiment of the present invention. The exemplary signal processing module is simply implemented by an audio processing circuit 802. The audio processing circuit 802 is utilized for performing a designated audio processing operation upon a third audio input S3' and accordingly generating a processed audio output SP' serving as the second audio input S2 fed into the audio mixing circuit 104 shown in FIG. 1. For example, the designated audio processing operation may be a post-processing operation used to add one or more special sound effects to the third audio input S3'. Alternatively, the designated audio processing operation may be any editing operation which adjusts the third audio input S3' but adds no special sound effect to the third audio input S3'. This also falls within the scope of the present invention. The third audio input S3' may be any audio bitstream suitable for post-processing. For example, the third audio input S3' may be provided by a signal source such as an optical storage medium, a computer network, a memory device, or any apparatus capable of providing a sound data.

Figure 9:
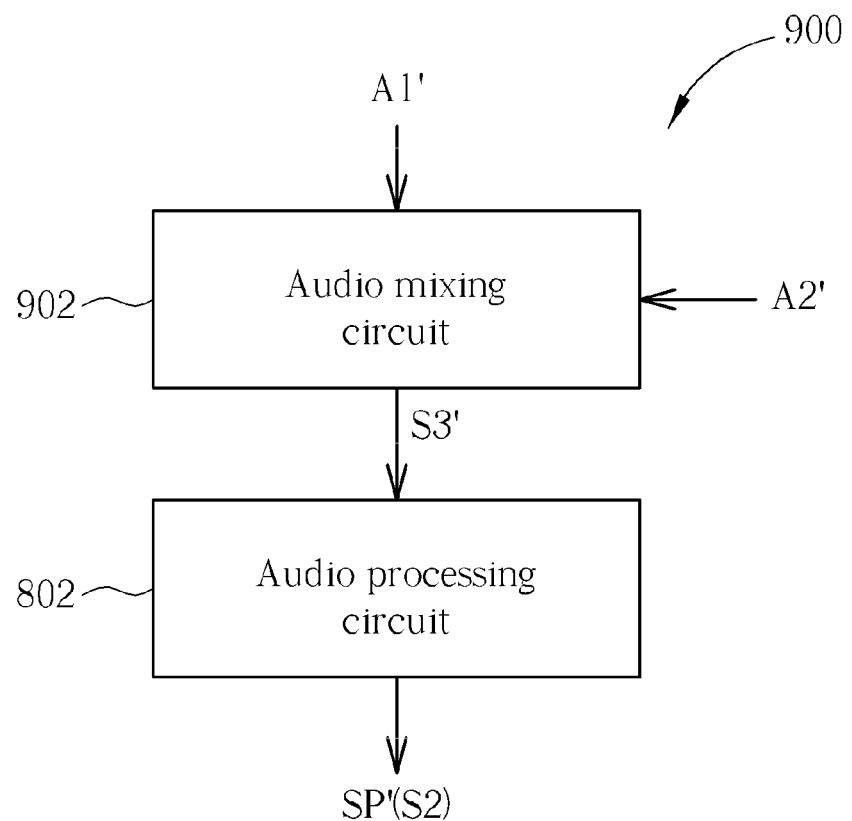
FIG. 9 is a diagram illustrating a signal processing module for generating the second audio input shown in FIG. 1 according to a fifth exemplary embodiment of the present invention.

Please refer to FIG. 9, which is a diagram illustrating a signal processing module for generating the second audio input S2 shown in FIG. 1 according to a fifth exemplary embodiment of the present invention. The exemplary signal processing module 900 includes, but is not limited to, the aforementioned audio processing circuit 802 and an audio mixing circuit 902 coupled to the audio processing circuit 802. The audio mixing circuit 902 is arranged to mix a plurality of specific audio inputs A1', A2' and accordingly generate the aforementioned third audio input S3' to the audio mixing circuit 804. The specific audio inputs A1' and A2' may be any audio bitstreams capable of being mixed to form the desired third audio input S3'. For example, at least one of the specific audio inputs A1' and A2' is derived from a signal source such as an optical storage medium, a computer network, a memory device, or any apparatus capable of providing a sound data.

In an exemplary case where the first audio input S1 shown in FIG. 1 is derived from the primary audio bitstream/secondary audio bitstream read from a BD disc and the second audio input S2 shown in FIG. 1 is derived from the effect sound data read from the same BD disc, the effect sound presented in the mixed audio signal SM to be transmitted to one audio output interface (e.g., an analog interface or an HDMI interface) can be post-processed/mixed individually regardless of the effect sound post-processing/mixing operation applied to an audio signal to be transmitted to another audio output interface.

Figure 10:
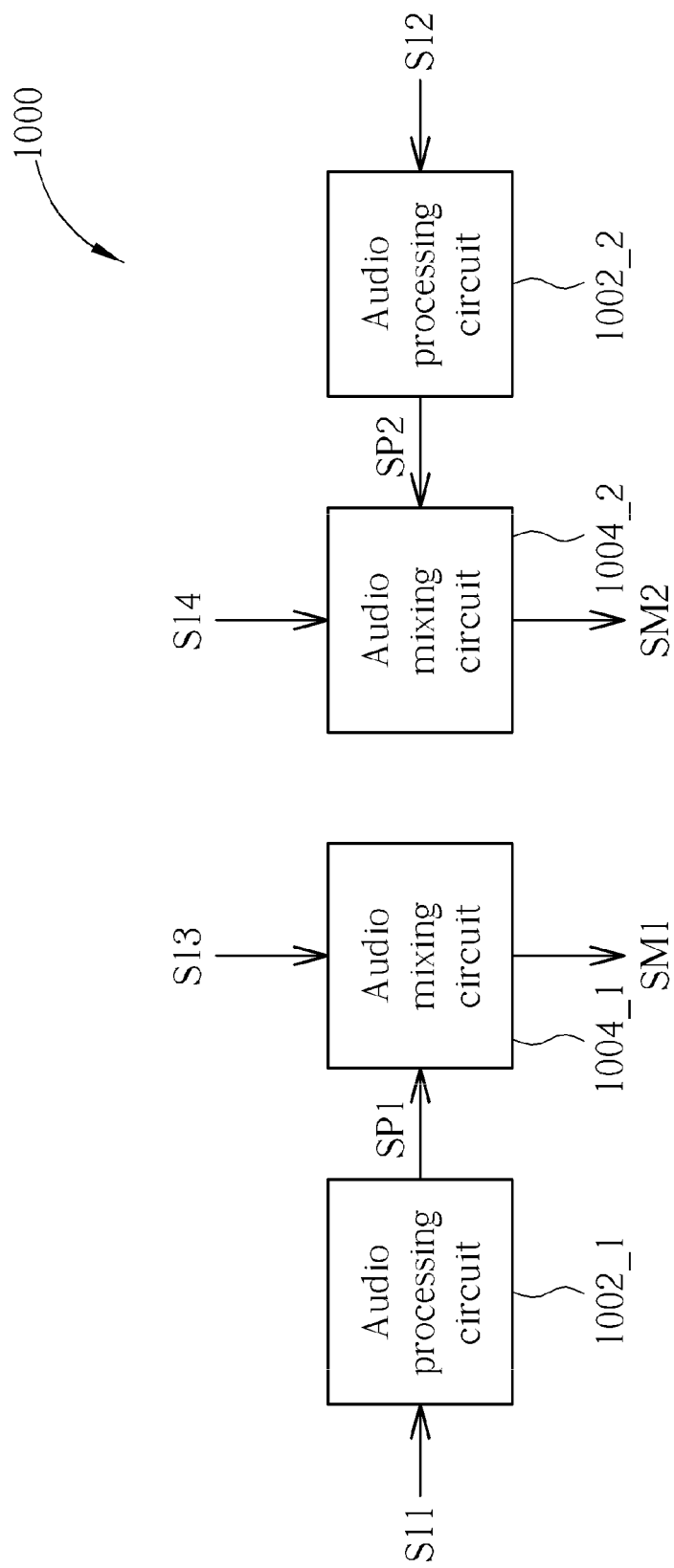
FIG. 10 is a diagram illustrating an audio mixing apparatus according to a second exemplary implementation of the present invention.

FIG. 10 is a diagram illustrating an audio mixing apparatus according to a second exemplary implementation of the present invention. The exemplary audio mixing apparatus 1000 includes, but is not limited to, a plurality of audio processing circuits 1002_1, 1002_2 and a plurality of audio mixing circuits 1004_1, 1004_2. The audio processing circuit 1002_1 is utilized for performing a first audio processing operation upon a first audio input S11 and accordingly generating a first processed audio output SP1. The audio processing circuit 1002_2 is utilized for performing a second audio processing operation upon a second audio input S12 and accordingly generating a second processed audio output SP2. In this exemplary embodiment, each of the first audio input S11 and the second audio input S12 may be derived from a non-encoded sound data such as an effect sound data read from an optical storage medium (e.g., a BD disc). Regarding each of the first and second audio processing operations, it may be a post-processing operation used to add one or more special sound effects to an audio input (i.e., S11/S12), or may be an editing operation which adjusts the audio input (i.e., S11/S12) but adds no special sound effect to the audio input (e.g., S11/S12). The audio mixing circuit 1004_1 is coupled to the audio processing circuit 1002_1, and utilized for generating a first mixed audio signal SM1 to one audio output interface (not shown) by mixing at least a third audio input S13 and the first processed audio output SP1. The audio mixing circuit 1004_2 is coupled to the audio processing circuit 1002_2, and utilized for generating a second mixed audio signal SM2 to another audio output interface (not shown) by mixing at least a fourth audio input S14 and the second processed audio output SP2.

In one case, the first and second audio processing operations are different audio processing operations, the first audio input S11 and the second audio input S12 are the same non-encoded sound data (e.g., the same effect sound data read from the optical storage medium), and the first processed audio output SP1 and the second processed audio output SP2 are respectively used to generate an analog output (e.g., an audio output for left-channel audio playback and right-channel audio playback) and an HDMI output (e.g., an audio output for 5.1-channel audio playback). The same effect sound data is therefore allowed to be post-processed and mixed differently. That is, the first processed audio output SP1 and the second processed audio output SP2 correspond to different post-processed effect sounds before processed by the respective audio mixing circuits 1004_1 and 1004_2. Besides, the first processed audio output SP1 may be mixed to a left channel and a right channel for the analog output, whereas the second processed audio output SP2 is mixed to a center channel for the HDMI output. Thus, no matter which one of the analog interface and HDMI interface of an optical storage apparatus (e.g., a BD player) is actually coupled to an audio playback device (e.g., a stereo speaker system or a 5.1-channel speaker system), the user can hear the effect sound with optimized sound quality. To put it another way, the proposed audio mixing apparatus makes the user have best listening experience of the effect sound playback.

In another case, the first and second audio processing operations are the same audio processing operation, the first audio input S11 and the second audio input S12 are the same non-encoded sound data (e.g., the same effect sound data read from the optical storage medium), and the first processed audio output SP1 and the second processed audio output SP2 are respectively used to generate an analog output (e.g., an audio output for left-channel audio playback and right-channel audio playback) and an HDMI output (e.g., an audio output for 5.1-channel audio playback). The first processed audio output SP1 and the second processed audio output SP2 would correspond to the same post-processed effect sound before processed by the respective audio mixing circuits 1004_1 and 1004_2. However, the first processed audio output SP1 is allowed to be mixed to a left channel and a right channel for the analog output, whereas the second processed audio output SP2 is allowed to be mixed to a center channel for the HDMI output. Thus, no matter which one of the analog interface and HDMI interface of an optical storage apparatus (e.g., a BD player) is actually coupled to an audio playback device (e.g., a stereo speaker system or a 5.1-channel speaker system), the user can hear the effect sound with optimized sound quality.

In yet another case, the audio processing circuits 1002_1 and 1002_2 may be omitted such that the first audio input S11 and the second audio input S12 are fed into the audio mixing circuits 1004_1 and 1004_2 respectively (i.e., SP1 and SP2 are respectively replaced with S11 and S12), the first audio input S11 and the second audio input S12 are the same non-encoded sound data (e.g., the same effect sound data read from the optical storage medium), and the first audio input S11 and the second audio input S12 are respectively used to generate an analog output (e.g., an audio output for left-channel audio playback and right-channel audio playback) and an HDMI output (e.g., an audio output for 5.1-channel audio playback). The first audio input S11 is allowed to be mixed to a left channel and a right channel for the analog output, whereas the second audio input S12 is allowed to be mixed to a center channel for the HDMI output. Thus, no matter which one of the analog interface and HDMI interface of an optical storage apparatus (e.g., a BD player) is actually coupled to an audio playback device (e.g., a stereo speaker system or a 5.1-channel speaker system), the user can hear the effect sound with optimized sound quality.

To put it simply, the use of the individual audio mixing circuits 1004_1 and 1004_2 allows the first mixed audio signal SM1 for a first audio output interface (e.g., an analog interface) and the second mixed audio signal SM2 for a second audio output interface (e.g., an HDMI interface) to be generated by mixing audio signals according to different sound mixing configurations, including a first sound mixing configuration referenced by the audio mixing circuit 1004_1 for mixing a plurality of first audio signals (e.g., S13 and SP1/S11) and a second sound mixing configuration referenced by the audio mixing circuit 1004_2 for mixing a plurality of second audio signals (e.g., S14 and SP2/S12).

Figure 11:
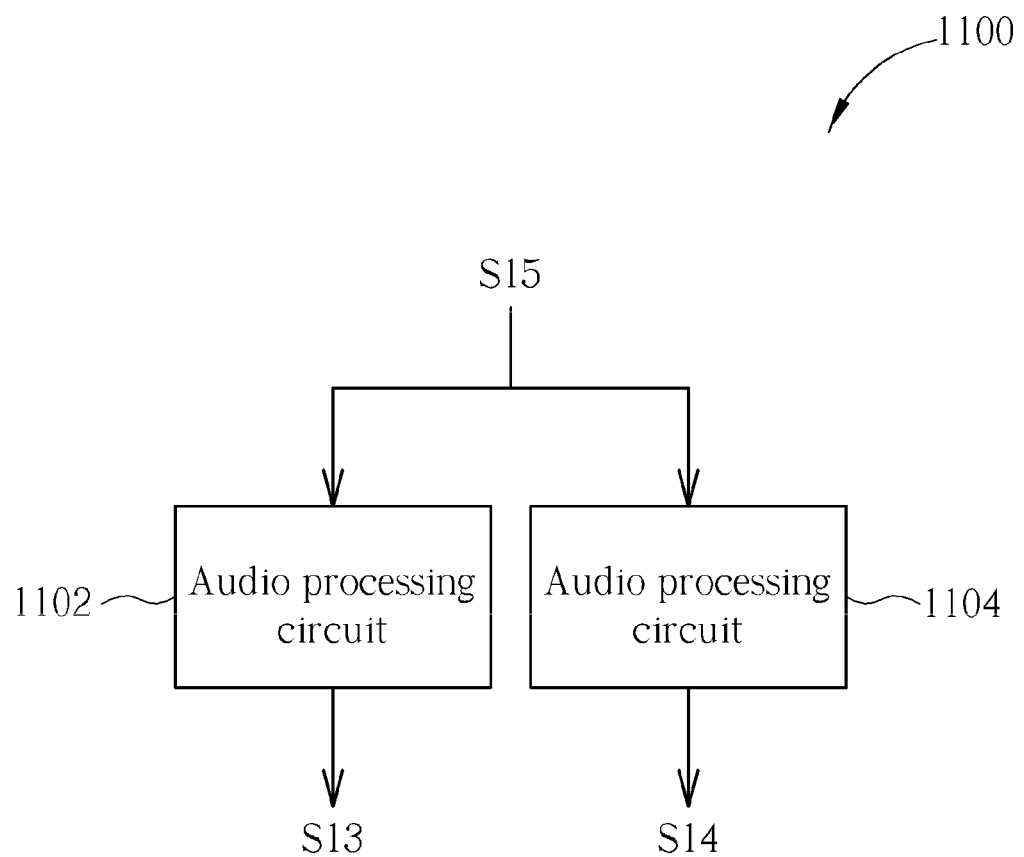
FIG. 11 is a diagram illustrating a signal processing module for generating the third audio input and the fourth audio input shown in FIG. 10 according to a first exemplary embodiment of the present invention.

Regarding each of the third audio input S13 and the fourth audio input S14 shown in FIG. 10, it may be any audio bitstream suitable for audio mixing. For example, the third audio input S13 and the fourth audio input S14 may be derived from the primary audio bitstream/secondary audio bitstream read from an optical storage medium (e.g., a BD disc). Please refer to FIG. 11, which is a diagram illustrating a signal processing module for generating the third audio input S13 and the fourth audio input S14 shown in FIG. 10 according to a first exemplary embodiment of the present invention. The exemplary signal processing module 1100 includes, but is not limited to, a plurality of audio processing circuits 1102 and 1104. The audio processing circuit 1102 is utilized for performing a third audio processing operation upon a fifth audio input S15 and accordingly generating the third audio input S13 supplied to the audio mixing circuit 1004_1 shown in FIG. 10. The audio processing circuit 1104 is utilized for performing a fourth audio processing operation upon the fifth audio input S15 and accordingly generating the fourth audio input S14 supplied to the audio mixing circuit 1004_2 shown in FIG. 10. By way of example, but not limitation, the fifth audio input S15 may be a mixed audio signal generated from mixing the primary audio bitstream and the secondary audio bitstream read from an optical storage medium (e.g., a BD disc). However, this is for illustrative purposes only, and is not meant to be a limitation of the present invention.

Figure 12:
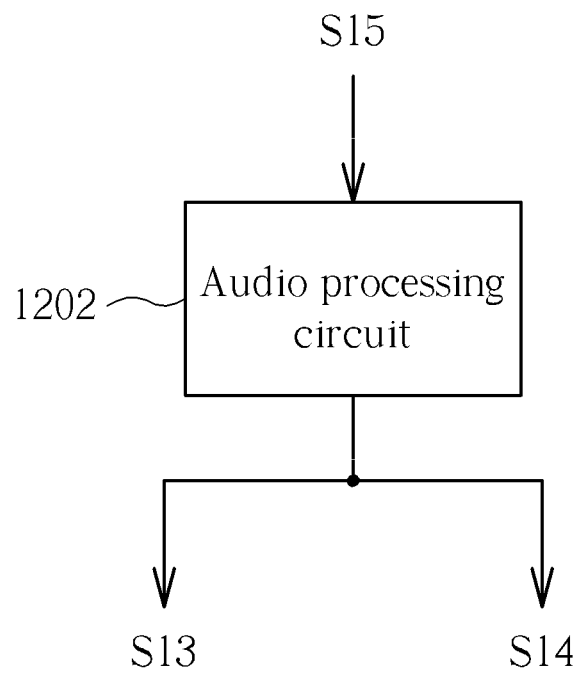
FIG. 12 is a diagram illustrating a signal processing module for generating the third audio input and the fourth audio input shown in FIG. 10 according to a second exemplary embodiment of the present invention.

Please refer to FIG. 12, which is a diagram illustrating a signal processing module for generating the third audio input S13 and the fourth audio input S14 shown in FIG. 10 according to a second exemplary embodiment of the present invention. The exemplary signal processing module is simply implemented by an audio processing circuit 1202. Specifically, the audio processing circuit 1202 generates the aforementioned third audio input S13 and fourth audio input S14 by performing a designated audio processing operation upon the same fifth audio input S15. In other words, the third audio input S13 and the fourth audio input S14 are identical to each other.

Figure 13:
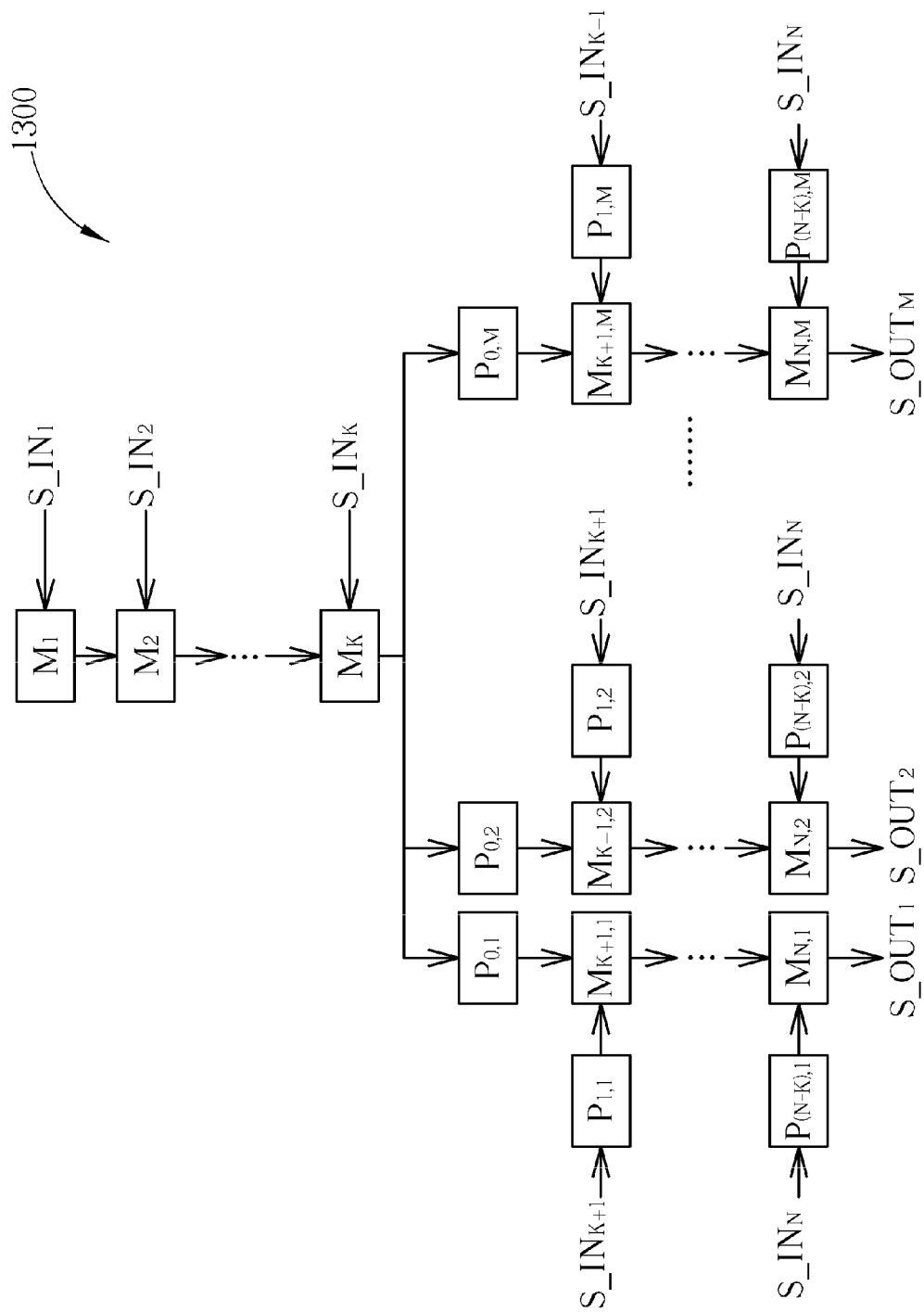
FIG. 13 is a diagram illustrating an audio mixing apparatus supporting multiple inputs and multiple outputs according to an exemplary embodiment of the present invention.

Based on the aforementioned audio mixing apparatuses and signal processing modules, an audio mixing apparatus supporting multiple inputs and multiple outputs may be realized. Please refer to FIG. 13, which is a diagram illustrating an audio mixing apparatus supporting multiple inputs and multiple outputs according to an exemplary embodiment of the present invention. The exemplary audio mixing apparatus 1300 is capable of receiving N audio inputs $S\_IN_1$-$S\_IN_N$ and outputting M mixed audio signals $S\_OUT_1$-$S\_OUT_M$ to M audio output interfaces (not shown), wherein M and N are positive integers. For example, the audio inputs $S\_IN_1$-$S\_IN_K$ include audio inputs derived from an encoded sound data such as the primary audio bitstream and the secondary bitstream read from an optical storage medium (e.g., a BD disc), and the audio inputs $S\_IN_{K+1}$-$S\_IN_N$ include at least one audio input derived from a non-encoded sound data such as the effect sound data read from the same optical storage medium. As can be seen from FIG. 13, the exemplary audio mixing apparatus 1300 includes, but is not limited to, a plurality of audio mixing circuits $M_1$-$M_K$, $M_{K+1,1}$-$M_{N,1}$, ..., $M_{K+1,M}$-$M_{N,M}$, and a plurality of audio processing circuits $P_{0,1}$-$P_{0,M}$, $P_{1,1}$-$P_{(N-K),1}$, ..., $P_{1,M}$-$P_{(N-K),M}$. Please note that a partial structure including the audio processing circuit $P_{0,1}$ and the audio mixing circuit $M_{K+1,1}$ is realized by the audio mixing apparatus 100 shown in FIG. 1, and a partial structure including the audio processing circuits $P_{1,1}$, $P_{1,2}$ and the audio mixing circuits $M_{K+1,1}$, $M_{K+1,2}$ is realized by the audio mixing apparatus 1000 shown in FIG. 10. As mentioned above, the audio inputs of the audio mixing apparatus 100/1000 may be provided by one of a plurality of proposed signal processing modules, depending upon the actual design requirement/consideration. Thus, a person skilled in the art should readily appreciate that modifications made to the audio mixing apparatus 1300 are feasible after reading above paragraphs directed to the audio mixing apparatuses 100 and 1000. For example, some audio processing circuits and/or audio mixing circuits included in the audio mixing apparatus 1300 shown in FIG. 13 may be omitted. Regarding the case where the optical storage medium is a BD disc, the same objective of making the same effect sound data to be post-processed and/or mixed differently in the generation of mixed audio signals respectively supplied to different audio output interfaces (e.g., an analog interface and an HDMI interface) is achieved.

Moreover, in the audio mixing apparatus 1300, the same audio inputs $S\_IN_{K+1}$-$S\_IN_N$ may be processed and/or mixed differently for generating the mixed audio signals $S\_OUT_1$-$S\_OUT_M$. However, in an alternative design, the number of audio inputs to be processed and then mixed with a processed audio output of one of the audio processing circuits $P_{0,1}$-$P_{0,M}$ may be different from the number of audio inputs to be processed and then mixed with a processed audio output of another one of the audio processing circuits $P_{0,1}$-$P_{0,M}$. This also falls within the scope of the present invention.

Please note that the exemplary audio mixing method/apparatus of the present invention is not limited to the playback of audio signals derived from data read from an optical storage medium (e.g., a BD disc). Any playback application employing the exemplary audio mixing method/apparatus mentioned above falls within the scope of the present invention.

Those skilled in the art will readily observe that numerous modifications and alterations of the device and method may be made while retaining the teachings of the invention.

What is claimed is:

1. An audio mixing method, comprising:
   performing a first audio processing operation upon a first audio input derived from at least one decoded audio input and accordingly generating a processed audio output, wherein the first audio processing operation is arranged to process one audio input only, and the processed audio output is different from the first audio input;
   generating a mixed audio signal by mixing at least a second audio input and the processed audio output;
   decoding a first encoded audio data and accordingly generating a first decoded audio input; and generating the first audio input by mixing the first decoded audio input and a third audio input.

2. The audio mixing method of claim 1, further comprising:
decoding a second encoded audio data and accordingly generating a second decoded audio input as the third audio input.

3. The audio mixing method of claim 1, further comprising:
reading an optical storage medium and accordingly obtaining the second audio input.

4. The audio mixing method of claim 3, wherein the second audio input is an effect sound data stored on the optical storage medium.

5. An audio mixing method, comprising:
performing a first audio processing operation upon a first audio input derived from at least one decoded audio input and accordingly generating a processed audio output, wherein the first audio processing operation is arranged to process one audio input only, and the processed audio output is different from the first audio input;
generating a mixed audio signal by mixing at least a second audio input and the processed audio output, wherein the second audio input is derived from at least a non-encoded sound data;
mixing a plurality of specific audio inputs and accordingly generating the second audio input.

6. The audio mixing method of claim 5, further comprising:
reading an optical storage medium and accordingly obtaining at least one of the specific audio inputs.

7. The audio mixing method of claim 6, wherein the at least one of the specific audio inputs is an effect sound data stored on the optical storage medium.

8. An audio mixing method, comprising:
performing a first audio processing operation upon a first audio input derived from at least one decoded audio input and accordingly generating a processed audio output, wherein the first audio processing operation is arranged to process one audio input only, and the processed audio output is different from the first audio input;
generating a mixed audio signal by mixing at least a second audio input and the processed audio output;
performing a second audio processing operation upon a third audio input, and accordingly generating the second audio input; and
mixing a plurality of specific audio inputs and accordingly generating the third audio input.

9. The audio mixing method of claim 8, further comprising:
reading an optical storage medium and accordingly obtaining the third audio input.

10. The audio mixing method of claim 9, wherein the third audio input is an effect sound data stored on the optical storage medium.

11. An audio mixing method, comprising:
performing a first audio processing operation upon a first audio input derived from mixing a plurality of first specific audio inputs and accordingly generating a processed audio output, wherein at least one of the first specific audio inputs is derived from at least one decoded audio input; and
generating a mixed audio signal by mixing at least a second audio input and the processed audio output.

12. The audio mixing method of claim 11, further comprising:
obtaining the specific audio inputs according to data read from an optical storage medium.

13. The audio mixing method of claim 11, further comprising:
reading an optical storage medium and accordingly obtaining the second audio input.

14. The audio mixing method of claim 13, wherein the second audio input is an effect sound data stored on the optical storage medium.

15. The audio mixing method of claim 11, further comprising:
mixing a plurality of second specific audio inputs and accordingly generating the second audio input.

16. The audio mixing method of claim 15, further comprising:
reading an optical storage medium and accordingly obtaining at least one of the second specific audio inputs.

17. The audio mixing method of claim 16, wherein the at least one of the second specific audio inputs is an effect sound data stored on the optical storage medium.

18. The audio mixing method of claim 11, further comprising:
performing a second audio processing operation upon a third audio input, and accordingly generating the second audio input.

19. The audio mixing method of claim 18, further comprising:
reading an optical storage medium and accordingly obtaining the third audio input.

20. The audio mixing method of claim 19, wherein the third audio input is an effect sound data stored on the optical storage medium.

21. The audio mixing method of claim 18, further comprising:
mixing a plurality of second specific audio inputs and accordingly generating the third audio input.

22. An audio mixing method, comprising:
performing a first audio processing operation upon a first audio input and accordingly generating a first processed audio output;
performing a second audio processing operation upon a second audio input and accordingly generating a second processed audio output, wherein the first audio processing operation and the second audio processing operation are different audio processing operations, and the first audio input and the second audio input are derived from a same non-encoded sound data stored on an optical storage medium;
generating a first mixed audio signal by mixing at least a third audio input and the first processed audio output;
generating a second mixed audio signal by mixing at least a fourth audio input and the second processed audio output;
decoding a first encoded audio data and accordingly generating a first decoded audio input; and
generating the first audio input by mixing the first decoded audio input and a fourth audio input.

23. The audio mixing method of claim 22, further comprising:
performing a third audio processing operation upon a fifth audio input, and accordingly generating the third audio input; and
performing a fourth audio processing operation upon the fifth audio input, and accordingly generating the fourth audio input.

24. The audio mixing method of claim 22, further comprising:

generating the third audio input and the fourth audio input by performing a third audio processing operation upon a fifth audio input.

25. An audio mixing apparatus, comprising:
an audio processing circuit, for performing an audio processing operation upon a first audio input derived from mixing a plurality of specific audio inputs and accordingly generating a processed audio output, wherein at least one of the first specific audio inputs is derived from at least one decoded audio input; and
an audio mixing circuit, coupled to the audio processing circuit, for generating a mixed audio signal by mixing at least a second audio input and the processed audio output.

26. An audio mixing apparatus, comprising:
a first audio processing circuit, for performing a first audio processing operation upon a first audio input and accordingly generating a first processed audio output;
a second audio processing circuit, for performing a second audio processing operation upon a second audio input and accordingly generating a second processed audio output, wherein the first audio processing operation and the second audio processing operation are different audio processing operations, and the first audio input and the second audio input are derived from a same non-encoded sound data stored on an optical storage medium;
a first audio mixing circuit, coupled to the first audio processing circuit, for generating a first mixed audio signal by mixing at least a third audio input and the first processed audio output; and
a second audio mixing circuit, coupled to the second audio processing circuit, for generating a second mixed audio signal by mixing at least a fourth audio input and the second processed audio output;
wherein the first audio input is generated by mixing a first decoded audio input and a fourth audio input, and the first decoded audio input is generated by decoding a first encoded audio data.

27. An audio mixing method, comprising:
performing a first audio processing operation upon a first audio input derived from at least one decoded audio input and accordingly generating a processed audio output, wherein the first audio processing operation is arranged to process one audio input only;
generating a mixed audio signal by mixing at least a second audio input and the processed audio output;
decoding a first encoded audio data and accordingly generating a first decoded audio input; and
generating the first audio input by mixing the first decoded audio input and a third audio input.

28. An audio mixing method, comprising:
performing a first audio processing operation upon a first audio input derived from at least one decoded audio input and accordingly generating a processed audio output, wherein the first audio processing operation is arranged to process one audio input only;
generating a mixed audio signal by mixing at least a second audio input and the processed audio output;
performing a second audio processing operation upon a third audio input, and accordingly generating the second audio input; and
mixing a plurality of specific audio inputs and accordingly generating the third audio input.

29. An audio mixing apparatus, comprising:
an audio processing circuit, for performing a first audio processing operation upon a first audio input derived from at least one decoded audio input and accordingly generating a processed audio output, wherein the first audio processing operation is arranged to process one audio input only;
a first audio mixing circuit, coupled to the audio processing circuit, for generating a mixed audio signal by mixing at least a second audio input and the processed audio output;
an audio decoding unit, for decoding a first encoded audio data and accordingly generating a first decoded audio input; and
a second audio mixing circuit, coupled between the audio decoding unit and the audio processing circuit, for generating the first audio input by mixing the first decoded audio input and a third audio input.

30. An audio mixing apparatus, comprising:
a first audio processing circuit, for performing a first audio processing operation upon a first audio input derived from at least one decoded audio input and accordingly generating a processed audio output, wherein the first audio processing operation is arranged to process one audio input only;
a first audio mixing circuit, coupled to the first audio processing circuit, for generating a mixed audio signal by mixing at least a second audio input and the processed audio output;
a second audio processing circuit, coupled to the first audio mixing circuit, for performing a second audio processing operation upon a third audio input, and accordingly generating the second audio input; and
a second audio mixing circuit, coupled to the second audio processing circuit, for mixing a plurality of specific audio inputs and accordingly generating the third audio input.

* * * * *